(12) United States Patent
Wong

(10) Patent No.: US 7,450,566 B2
(45) Date of Patent: *Nov. 11, 2008

(54) APPARATUS AND METHOD FOR PROVIDING A UNIFIED TELEPHONY SOLUTION

(75) Inventor: Johnny Wong, Richmond, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1197 days.

This patent is subject to a terminal disclaimer.

(21) Appl. No.: 10/642,251

(22) Filed: Aug. 14, 2003

(65) Prior Publication Data

US 2004/0246822 A1    Dec. 9, 2004

Related U.S. Application Data

(60) Provisional application No. 60/476,771, filed on Jun. 5, 2003.

(51) Int. Cl.
*H04L 12/66* (2006.01)

(52) U.S. Cl. ...................................... 370/352

(58) Field of Classification Search ....................... None
See application file for complete search history.

(56) References Cited

U.S. PATENT DOCUMENTS

| | | | |
|---|---|---|---|
| 6,922,411 B1 * | 7/2005 | Taylor | 370/401 |
| 7,058,695 B2 * | 6/2006 | Takagi et al. | 709/217 |
| 7,184,534 B2 * | 2/2007 | Birch et al. | 379/211.01 |
| 2002/0006124 A1 * | 1/2002 | Jimenez et al. | 370/352 |
| 2004/0258238 A1 * | 12/2004 | Wong | 379/900 |

FOREIGN PATENT DOCUMENTS

WO    WO 98/58332 A1  *  12/1998

* cited by examiner

*Primary Examiner*—Ramnandan Singh
(74) *Attorney, Agent, or Firm*—Park, Vaughan & Fleming LLP; Edward J. Grundler

(57) ABSTRACT

One embodiment of the present invention provides a system that provides a unified telephony solution. During operation, the system receives a request for a telephony service at a telephony controller. In response to this request, the system accesses a telephony service provided by an application server through a voice extensible markup language (VXML) browser. While performing the telephony service, the system interfaces to a public switched telephone network (PSTN) through a telephony gateway.

18 Claims, 7 Drawing Sheets

APPARATUS AND METHOD FOR PROVIDING A UNIFIED TELEPHONY SOLUTION

RELATED APPLICATION

This application hereby claims priority under 35 U.S.C. §119 to U.S. Provisional Patent Application No. 60/476,771 filed on Jun. 5, 2003, entitled "Unified Telephony Platform," by inventor Johnny Wong.

The subject matter of this application is related to the subject matter in a co-pending non-provisional application by the same inventor as the instant application entitled, "Method and Apparatus for Providing Web Service Access to Telephony Functionality," having Ser. No. 10/655,647, and filing date 4 Sep. 2003.

BACKGROUND

1. Field of the Invention

The present invention relates to systems that provide telephony services. More specifically, the present invention relates to an apparatus and a method that provides a unified telephony solution.

2. Related Art

Modern business enterprises make extensive use of different systems to provide telephony services, such as private branch exchange (PBX) systems, interactive voice response (IVR) systems, telephones, call centers, unified messaging systems, voice mail systems, teleconferencing systems, and next-generation applications that are currently available or will soon be available.

Each of the above-listed systems is typically provided by a different vendor. This piecemeal approach can fulfill the basic telephony requirements for a business enterprise. However, this approach has many drawbacks.

Each of the systems can be very costly. Hence, purchasing each solution from a different vendor can be an expensive proposition. Additionally, installing and maintaining the disparate systems is costly and often complicated because it can require services from many different entities. Furthermore, when there is a system failure, it is not always clear which system failed. This can make a problem hard to diagnose and can result in the wrong person being contacted to fix a problem. Moreover, adding new functionality can require services from multiple providers.

Furthermore, each of the different systems is typically designed with an inflexible proprietary architecture, which makes it hard for the systems to interoperate with each other.

Hence, what is needed is an apparatus and a method for providing a unified telephony solution that provides all of the above-listed services without the problems described above.

SUMMARY

One embodiment of the present invention provides a system that provides a unified telephony solution. During operation, the system receives a request for a telephony service at a telephony controller. In response to this request, the system accesses a telephony service provided by an application server through a voice extensible markup language (VXML) browser. While performing the telephony service, the system interfaces to a public switched telephone network (PSTN) through a telephony gateway.

In a variation of this embodiment, the telephony controller includes a SIP framework with a SIP servlet container, wherein the SIP servlet container includes multiple SIP servlets for interfacing with a SIP network.

In a further variation, a new telephony service can be added by including a new SIP servlet in the SIP servlet container.

In a further variation, the SIP servlets are registered with a remote method invocation (RMI) registry.

In a further variation, the telephony services provide at least two of: a telephone system, a call center, an interactive voice response (IVR) system, and a voicemail system.

In a further variation, the system operates using a Voice Over Internet Protocol (VOIP).

In a further variation, the application server is coupled to a database that provides access to the plurality of SIP servlets.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Unified Telephony Solution

Figure 1:
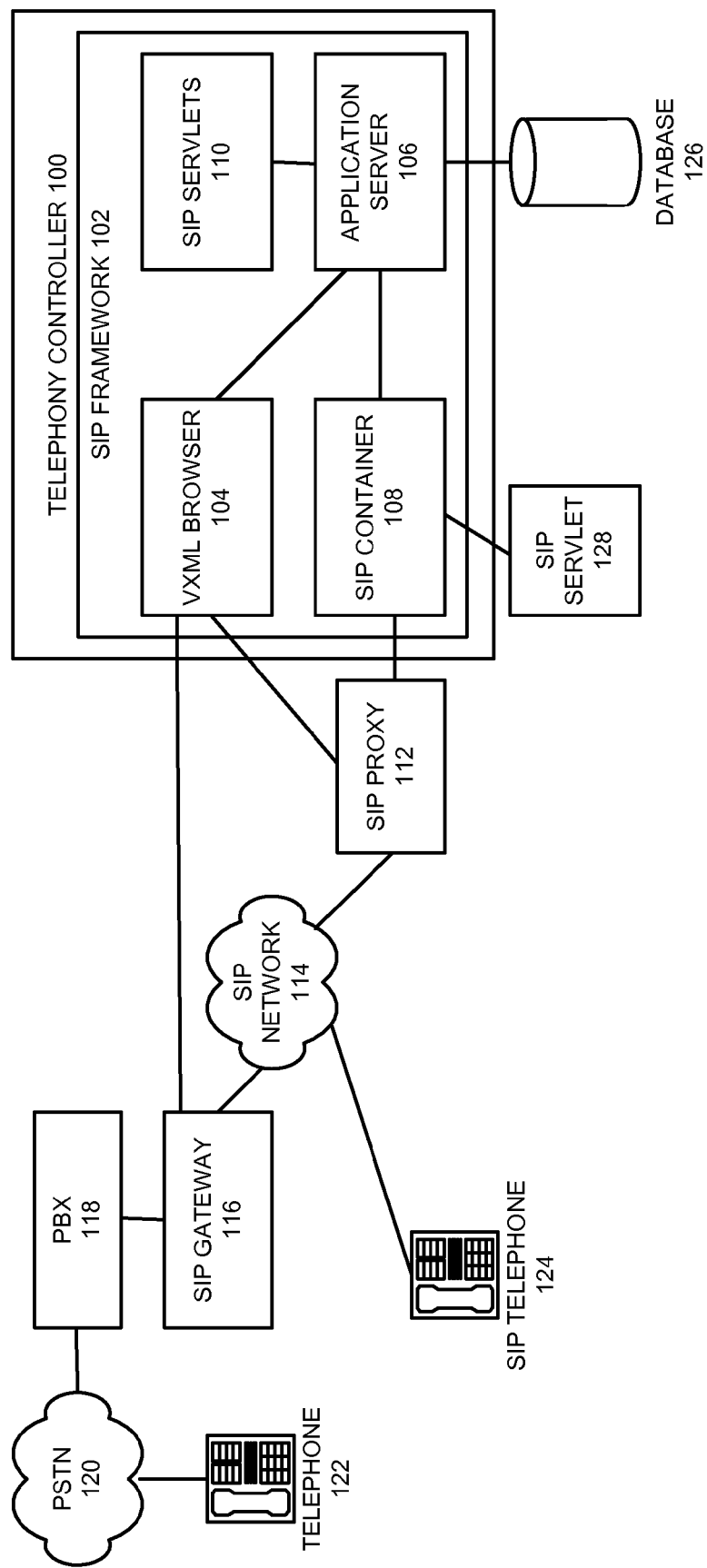
FIG. 1 illustrates a unified telephony solution in accordance with an embodiment of the present invention.

FIG. 1 illustrates a system that provides a unified telephony solution in accordance with an embodiment of the present invention. The system illustrated in FIG. 1 includes telephony controller 100 including session initiation protocol (SIP)

framework 102, SIP proxy 112, SIP network 114, SIP gateway 116, private branch exchange (PBX) 118, public switched telephone network (PSTN) 120, telephone 122, SIP telephone 124, database 126, and SIP servlet 128. SIP framework includes voice extensible markup language (VXML) browser 104, application server 106, SIP container 108, and SIP servlets 110.

Telephone 122 is coupled to PBX 118 across PSTN 120. This allows telephone 122 to access SIP network 114 and VXML browser 104 through SIP gateway 116. In contrast, SIP telephone 124 is coupled directly to SIP network 114, which couples various SIP devices, including SIP telephone 124, with SIP proxy 112. SIP proxy 112 provides an interface to VXML browser 104 and SIP container 108. Note that SIP container 108 includes currently registered SIP servlets such a SIP servlet 128.

VMXL browser 104 and SIP container 108 communicate with application server 106 to provide access to the various telephony services provided by the unified telephony solution. During operation, application server 106 receives SIP servlets 110 from database 126 and registers the SIP servlets 110 in SIP container 108.

A user (not shown) can use telephone 122 or SIP telephone 124 to access any of the telephony services provided by application server 106. This process is as described below in conjunction with FIGS. 2-7.

Click-to-Dial Application

Figure 2:
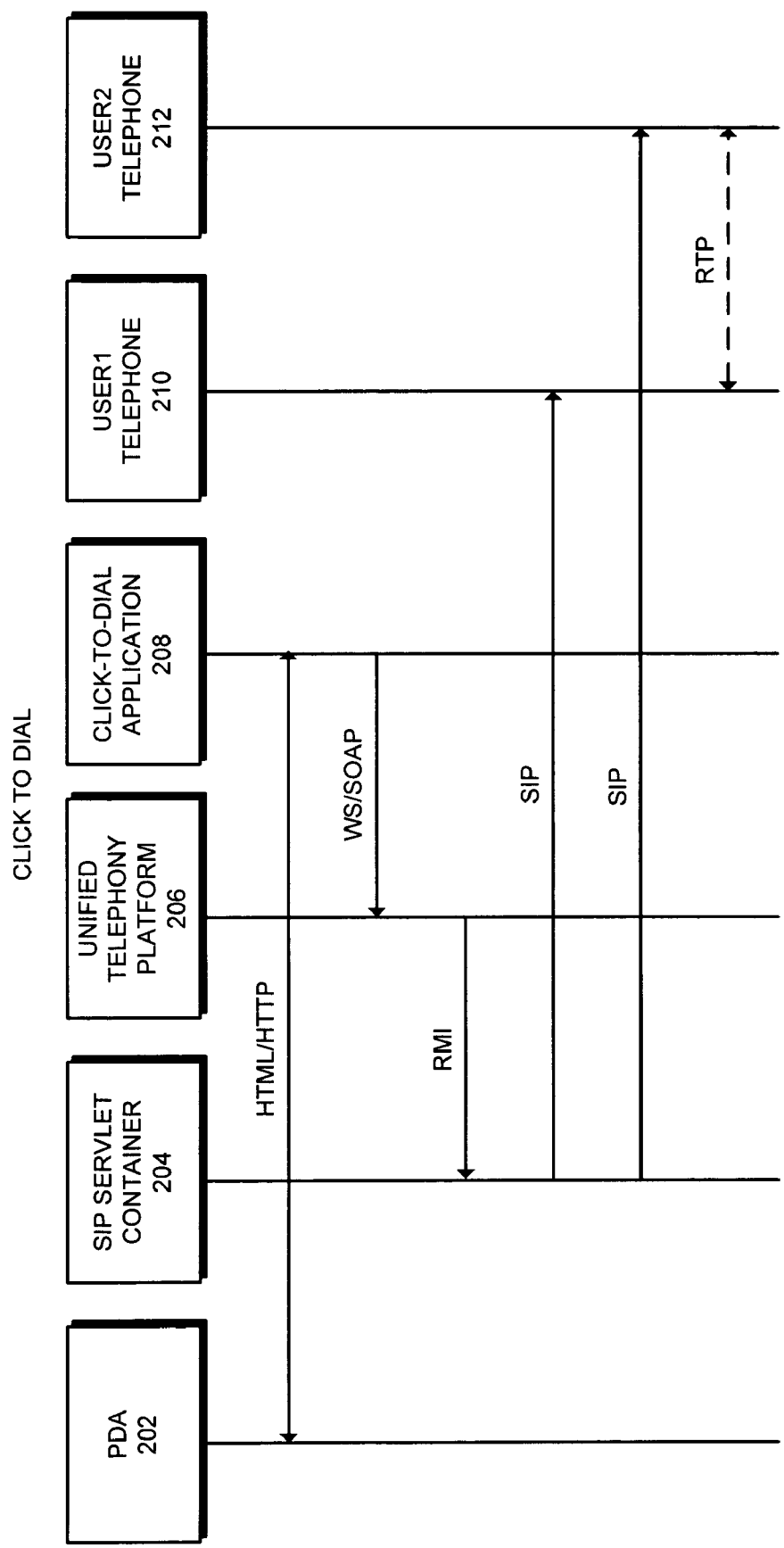
FIG. 2 provides an activity diagram of a click-to-dial application in accordance with an embodiment of the present invention.

FIG. 2 provides an activity diagram of an exemplary click-to-dial application in accordance with an embodiment of the present invention. In this example, a user can select a desired phone number through personal digital assistant (PDA) 202. This phone number is then transferred to click-to-dial application 208 using hypertext markup language/hypertext transfer protocol (HTML/HTTP). Next, click-to-dial application 208 transfers the phone number to unified telephony platform 206 using web service/simple object access protocol (WS/SOAP).

Unified telephony platform 206 subsequently uses remote method invocation (RMI) to access the proper SIP servlet within SIP servlet container 204. This RMI can take place through an RMI registry. The SIP servlet within SIP servlet container 204 sends a SIP message to user1 telephone 210 and a SIP message to user2 telephone 212. These SIP messages cause user1 telephone 210 and user2 telephone 212 to initiate a real-time transport protocol (RTP) session. User 1 and user 2 can then communicate with each other over the RTP session.

Conferencing Application

Figure 3:
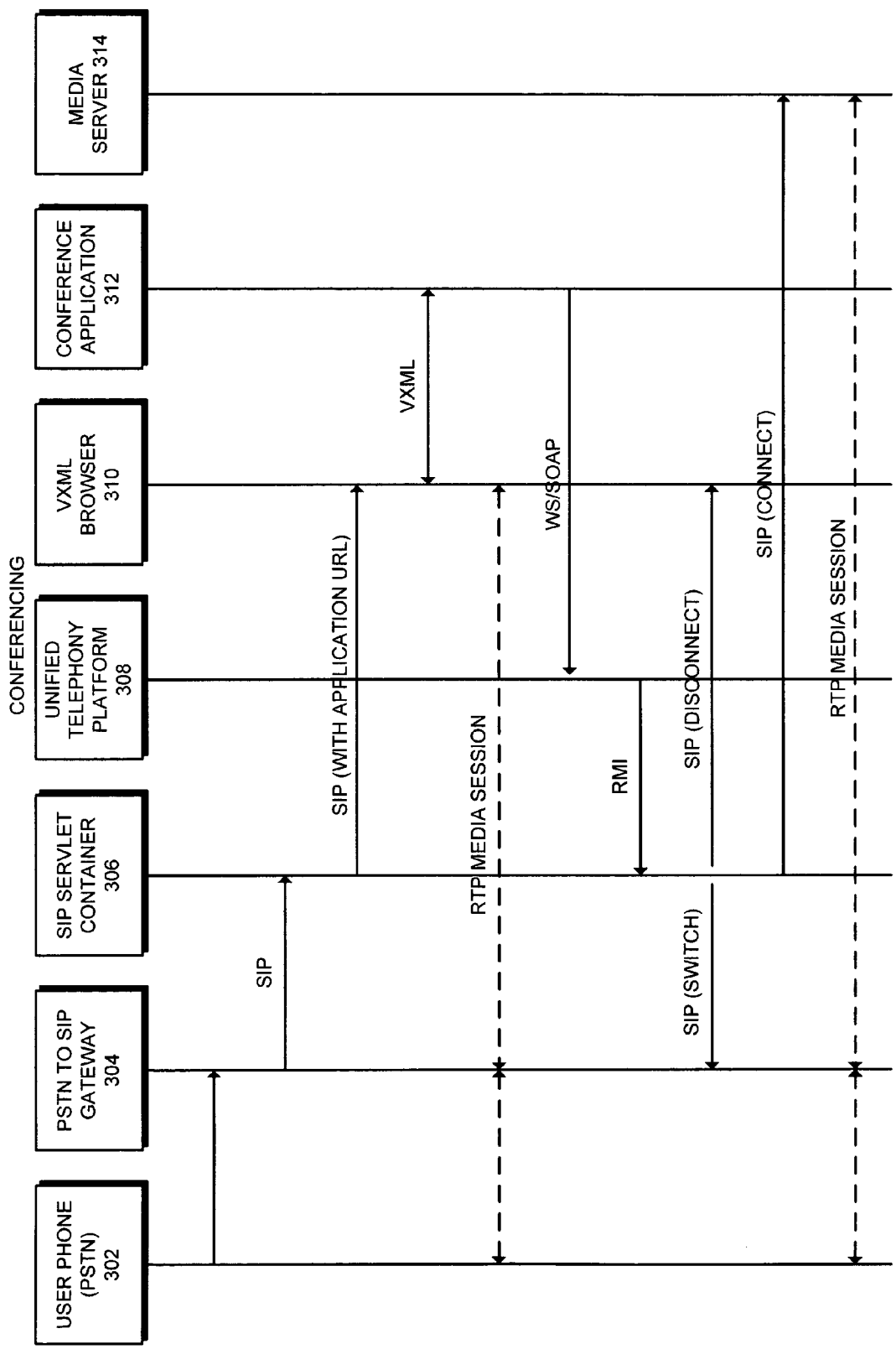
FIG. 3 provides an activity diagram of a conferencing application in accordance with an embodiment of the present invention.

FIG. 3 provides an activity diagram of a teleconferencing application in accordance with an embodiment of the present invention. A user wishing to join a conference call can initiate a call from a user phone on the public switched telephone network (PSTN) 302. PSTN-to-SIP gateway 304 then sends a SIP message to a SIP servlet within SIP servlet container 306 to join the conference call. Next, the SIP servlet within SIP servlet container 306 sends a SIP message including an application URL to voice extensible markup language (VXML) browser 310.

VXML browser 310 then communicates with conference application 312 to establish parameters for joining the conference call, including the location of the media server, in this case media server 314. VXML browser 310 also establishes an RTP media session through PSTN to SIP gateway 304 to user phone (PSTN) 302. This RTP media session allows the user at user phone (PSTN) 302 to communicate with VXML browser 310.

Once the proper conference is identified, conference application 312 initiates a WS/SOAP message to unified telephony platform 308 to join the conference call. In response, unified telephony platform 308 performs a remote method invocation to a servlet within SIP servlet container 306.

The servlet within SIP servlet container 306 then initiates a SIP disconnect message to VXML browser 310 and a SIP switch message to PSTN to SIP gateway 304. The SIP servlet also initiates a SIP connect message to media server 314. These messages cause the RTP session between user phone (PSTN) 302 and VXML browser 310 to be dropped and an RTP session to be established between user phone (PSTN) 302 and media server 314.

Application-Initiated Conferencing

Figure 4:
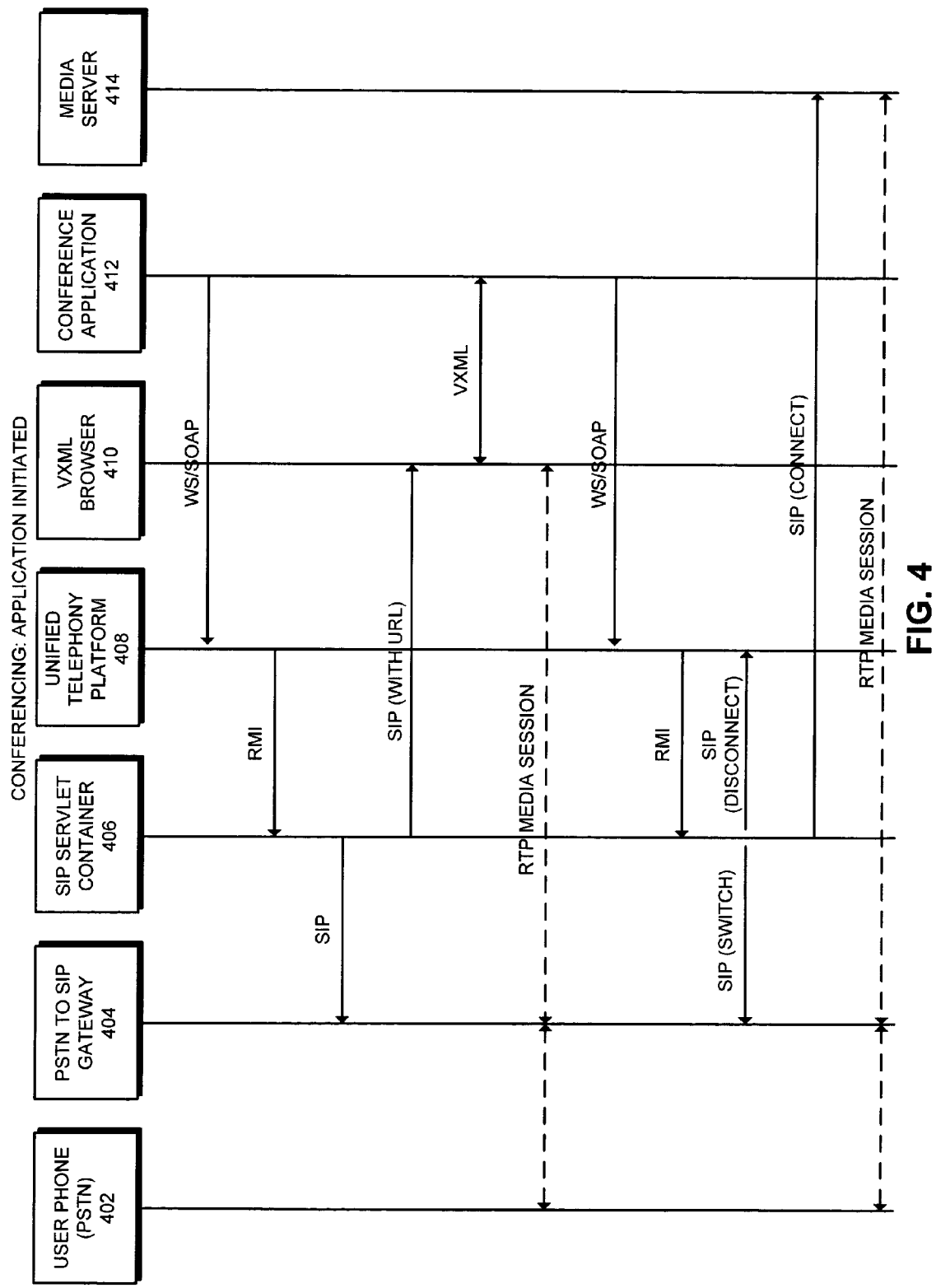
FIG. 4 provides an activity diagram of application-initiated conferencing in accordance with an embodiment of the present invention.

FIG. 4 provides an activity diagram of application-initiated conferencing in accordance with an embodiment of the present invention. In this example, conference application 412 initiates a WS/SOAP message to unified telephony platform 408 to invite user phone (PSTN) 402 to join the conference call. In response, unified telephony platform 408 performs a remote method invocation to a SIP servlet within SIP servlet container 406.

To initiate the connection, the SIP servlet sends a SIP message to PSTN to SIP gateway 404. The SIP servlet also sends a SIP message with a URL to VXML browser 410. VXML browser 410 then communicates with conference application 412 using VXML and also communicates with user phone (PSTN) 402 across an RTP media session.

After establishing that the user is available at user phone (PSTN) 402, conference application 412 issues a WS/SOAP message to unified telephony platform 408 to switch user phone (PSTN) 402 to the conference call. In response to this message, unified telephony platform 408 performs a remote method invocation to a SIP servlet within SIP servlet container 406.

The SIP servlet then issues a SIP (switch) message to PSTN to SIP gateway 404, a SIP (disconnect) message to unified telephony platform 408, and a SIP connect message to media server 414. These SIP messages cause user phone (PSTN) 402 to be connected to media server 414 across an RTP media session thereby joining the conference call.

Call Center Application

Figure 5:
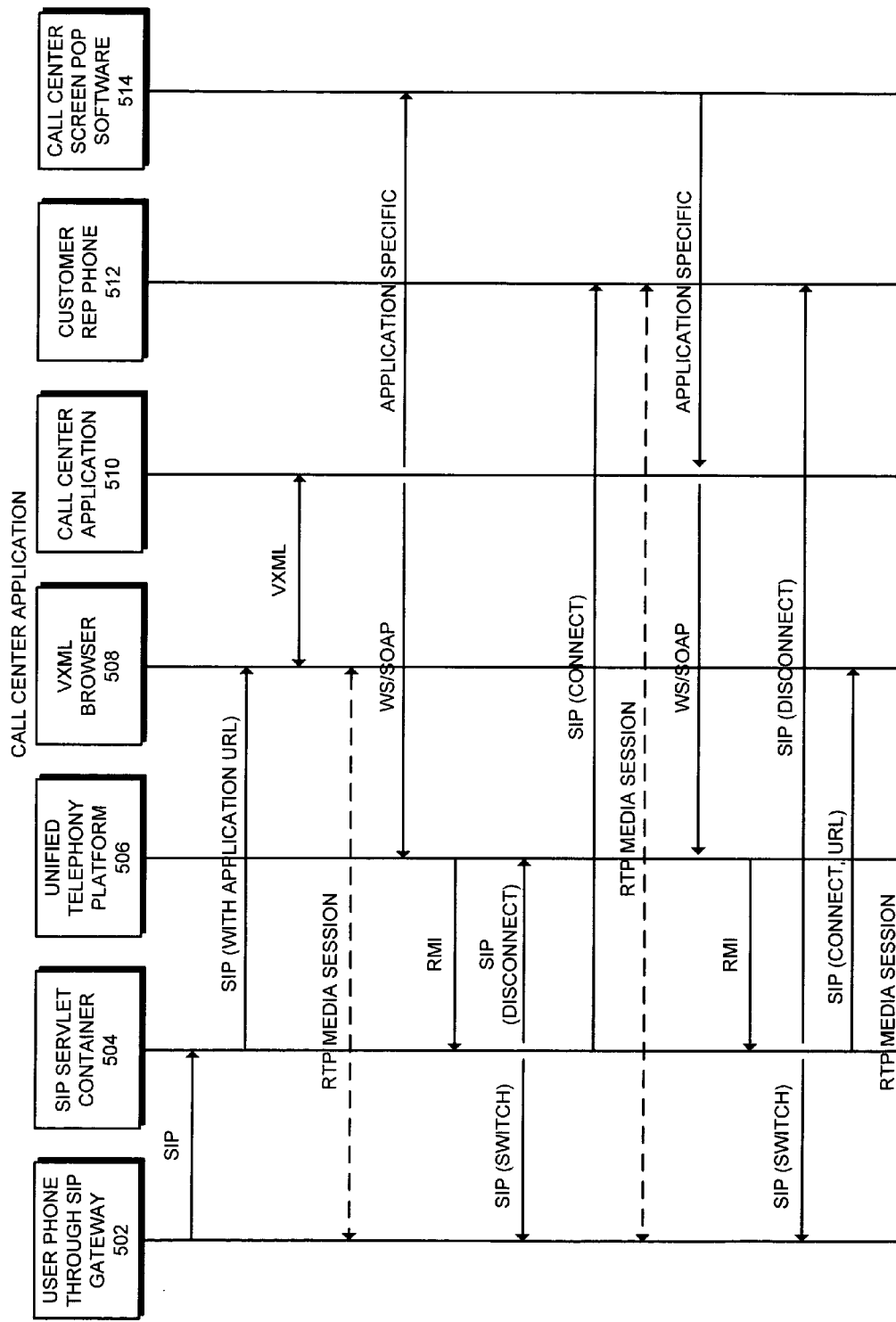
FIG. 5 provides an activity diagram for a call center application in accordance with an embodiment of the present invention.

FIG. 5 provides an activity diagram of an exemplary call center application in accordance with an embodiment of the present invention. First, a user contacts the call center connects to a SIP servlet within SIP servlet container 504 from user phone through SIP gateway 502. In response, the SIP servlet sends a SIP message with an application URL to VXML browser 508. VXML browser 508 then establishes a VSML session with call center application 510 and an RTP media session with user phone through SIP gateway 502.

After the user selects the desired option from call center application 510, call center application 510 sends a WS/SOAP message to unified telephony platform 506 and an application specific message to call center screen pop software 514. In response to the WS/SOAP message, unified telephony platform 506 invokes a SIP servlet within SIP servlet container 504 using remote method invocation. This SIP servlet sends a SIP switch message to user phone through SIP gateway 502, a SIP disconnect message to unified telephony platform 506, and a SIP connect message to customer rep phone 512. These messages connect user phone through SIP gateway 502 to customer rep phone 512 across an RTP media session.

After the user finishes conducting business with the customer service representative, call center screen pop software 514 sends an application specific message to call center application 510. In response, call center application 510 sends a WS/SOAP message to unified telephony platform 506 to switch the user back to VXML browser 508. Next, unified telephony platform 506 makes a remote method invocation to a SIP servlet within SIP servlet container 504. This SIP servlet issues a SIP switch command to user phone through SIP gateway 502, a SIP disconnect command to customer rep phone 512, and a SIP connect with URL command to VXML browser 508. These commands connect user phone through SIP gateway 502 to VXML browser 508 using an RTP media session.

Voicemail Application

Figure 6:
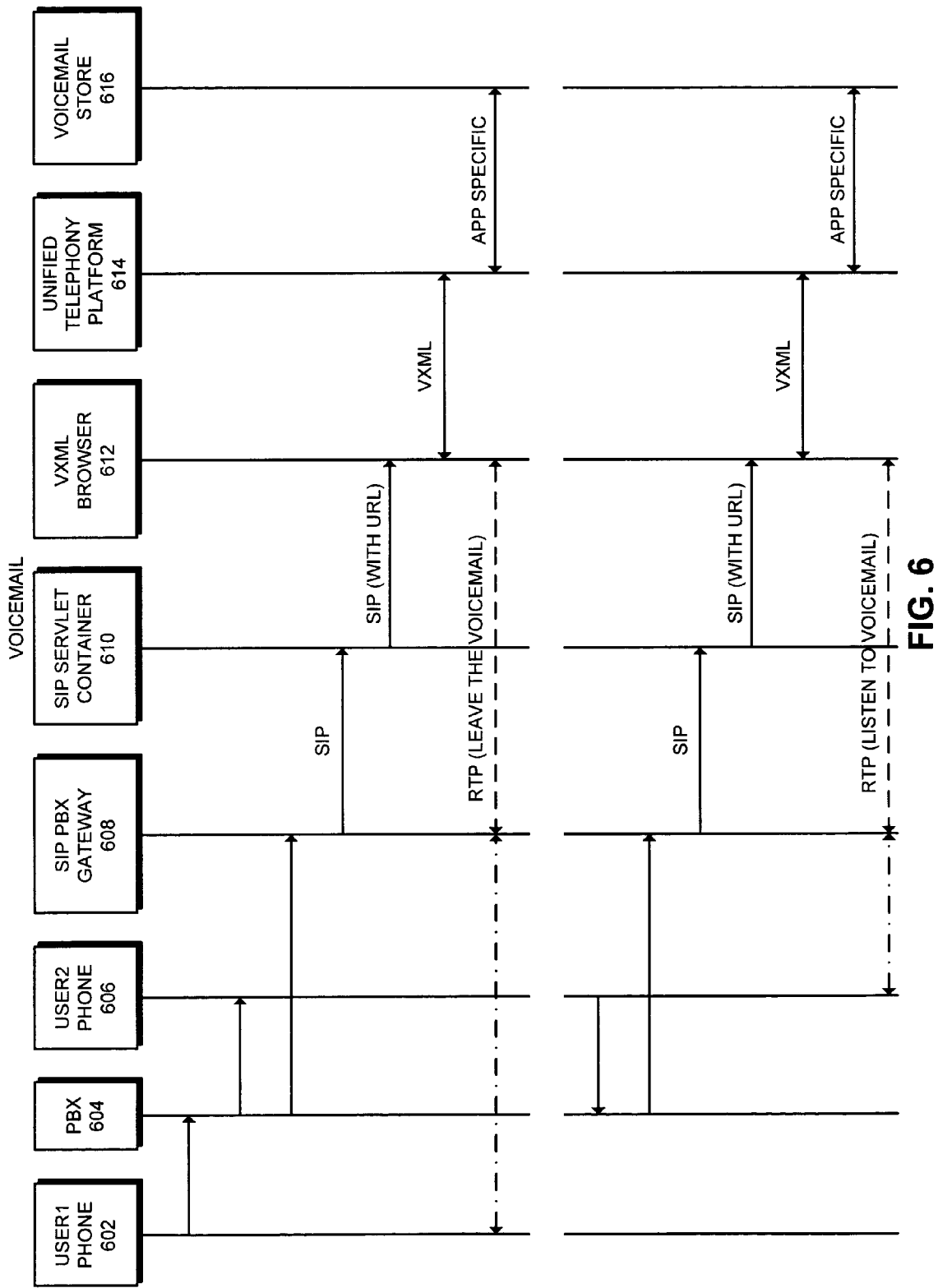
FIG. 6 provides an activity diagram for a voicemail application in accordance with an embodiment of the present invention.

FIG. 6 provides an activity diagram of an exemplary voicemail application in accordance with an embodiment of the present invention. In this example, a first user at user1 phone 602 attempts to reach a second user at user2 phone 606 through PBX 604. After a specified number of rings with no answer at user2 phone 606, PBX 604 disconnects from user2 phone 606 and connects to SIP-PBX gateway 608. SIP-PBX gateway 608 then sends a SIP message to a SIP servlet within SIP servlet container 610. This causes the SIP servlet to send a SIP message with a URL to VXML browser 612.

Next, VXML browser 612 initiates a VXML session with a voicemail application running on unified telephony platform 614 and an RTP session through SIP PBX gateway 608 to user1 phone 602 so the first user can leave a voicemail message. The voicemail application running on unified telephony platform 614 then connects to voicemail store 616 to store the incoming voicemail message.

At a later time, the second user connects to PBX 604 using user2 phone 606 to retrieve the voicemail message. In response, PBX 604 connects to SIP-PBX gateway 608. SIP-PBX gateway 608 then sends a SIP message to a SIP servlet within SIP servlet container 610 requesting retrieval of the voicemail message.

Next, the SIP servlet sends a SIP message with a URL to VXML browser 612. VXML browser 612 then establishes a VXML session with the voicemail application in unified telephony platform 614 and an RTP session with user2 phone 606 through SIP PBX gateway 608. The voicemail application in unified telephony platform 614 then connects to voicemail store 616 to retrieve the voicemail message and provide the voicemail message to the second user at user2 phone 606.

PBX Functionality

Figure 7:
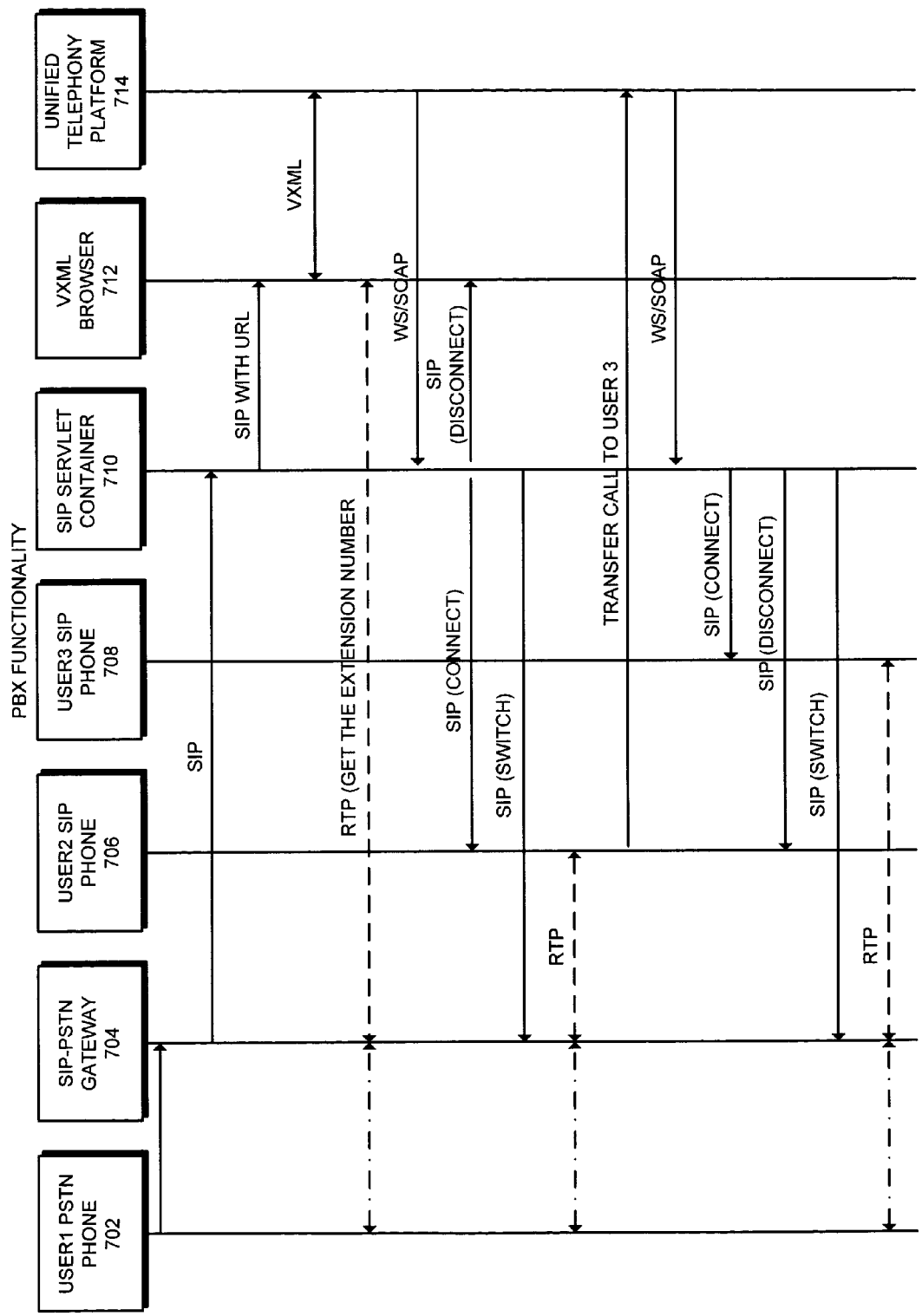
FIG. 7 provides an activity diagram of PBX functionality in accordance with an embodiment of the present invention.

FIG. 7 provides an activity diagram of exemplary PBX functionality in accordance with an embodiment of the present invention. A first user initially connects to SIP-PSTN gateway 704 using user1 PSTN phone 702. In response, user1 PSTN phone 702 sends a SIP message to a SIP servlet within SIP servlet container 710. This SIP servlet, in turn, sends a SIP message with a URL to VXML browser 712.

Next, VXML browser 712 establishes a VXML session with unified telephony platform 714 and an RTP session with user1 PSTN phone 702 through SIP-PSTN gateway 704. The first user can then retrieve the extension number for a second user from unified telephony platform 714. The first user can then indicate to unified telephony platform 714 that a connection with the second user is desired.

If the first user desires the connection, unified telephony platform 714 sends a WS/SOAP message to a SIP servlet in SIP servlet container 710 to make the connection. In response, the SIP servlet sends a SIP connect message to user2 SIP phone, a disconnect message to VXML browser 712, and a switch message to SIP-PSTN gateway 704. These messages connect user 1 PSTN phone to user2 SIP phone across SIP-PSTN gateway 704.

If it is desired to transfer the call to a third user, the second user can initiate the call transfer by sending a message from user2 SIP phone 706 to unified telephony platform 714. In response to this message, unified telephony platform 714 sends a WS/SOAP message to a SIP servlet in SIP servlet container 710 to transfer the connection. The SIP servlet then sends a SIP connect message to user3 SIP phone 708, a SIP disconnect message to user2 SIP phone 706, and a SIP switch message to SIP-PSTN gateway 704. These messages cause the RTP session to be transferred to user3 SIP phone 708.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus that provides a unified telephony solution, comprising:
    an application server configured to provide telephony services;
    a voice extensible markup language (VXML) browser configured to access telephony services through the application server;
    a telephony controller configured to access telephony services through the VXML browser, wherein the telephony controller includes a SIP framework with a SIP servlet container, wherein the SIP servlet container includes a plurality of SIP servlets for interfacing with a SIP network; and
    a telephony gateway that provides an interface to a public switched telephone network (PSTN).

2. The apparatus of claim 1, wherein a new telephony service can be added by including a new SIP servlet in the SIP servlet container.

3. The apparatus of claim 1, wherein the plurality of SIP servlets are registered with a remote method invocation (RMI) registry.

4. The apparatus of claim 1, wherein the telephony services provide at least two of:
    a telephone system;
    a call center;
    an interactive voice response (IVR) system; and
    a voicemail system.

5. The apparatus of claim 1, wherein the apparatus operates using a Voice Over Internet Protocol (VOIP).

6. The apparatus of claim 1, wherein the application server is coupled to a database that provides access to the plurality of SIP servlets.

7. A method that provides a unified telephony solution, comprising:
    receiving a request for a telephony service at a telephony controller, wherein the telephony controller includes a SIP framework with a SIP servlet container, wherein the SIP servlet container includes a plurality of SIP servlets for interfacing with a SIP network; and
    in response to the request, accessing a telephony service provided by an application server;
    wherein the application server is accessed through a voice extensible markup language (VXML) browser;
    wherein performing the telephony service involves interfacing to a public switched telephone network (PSTN) through a telephony gateway.

8. The method of claim 7, wherein a new telephony service can be added by including a new SIP servlet in the SIP servlet container.

9. The method of claim 7, wherein the plurality of SIP servlets are registered with a remote method invocation (RMI) registry.

10. The method of claim 7, wherein the telephony services provide at least two of:
   a telephone system;
   a call center;
   an interactive voice response (IVR) system; and
   a voicemail system.

11. The method of claim 7, wherein the telephony services operate using the Voice Over Internet Protocol (VOIP).

12. The method of claim 7, wherein the application server is coupled to a database that provides access to the plurality of SIP servlets.

13. A computer-readable storage device storing instructions that when executed by a computer cause the computer to perform a method that provides a unified telephony solution, the method comprising:
   receiving a request for a telephony service at a telephony controller, wherein the telephony controller includes a SIP framework with a SIP servlet container, wherein the SIP servlet container includes a plurality of SIP servlets for interfacing with a SIP network; and
   in response to the request, accessing a telephony service provided by an application server through a voice extensible markup language (VXML) browser;
   wherein the telephony service involves interfacing to a public switched telephone network (PSTN) through a telephony gateway.

14. The computer-readable storage device of claim 13, wherein a new telephony service can be added by including a new SIP servlet in the SIP servlet container.

15. The computer-readable storage device of claim 13, wherein the plurality of SIP servlets are registered with a remote method invocation (RMI) registry.

16. The computer-readable storage device of claim 13, wherein the telephony services provide at least two of:
   a telephone system;
   a call center;
   an interactive voice response (IVR) system; and
   a voicemail system.

17. The computer-readable storage device of claim 13, wherein the telephony services operate using the Voice Over Internet Protocol (VOIP).

18. The computer-readable storage device of claim 13, wherein the application server is coupled to a database that provides access to the plurality of SIP servlets.

* * * * *

UNITED STATES PATENT AND TRADEMARK OFFICE
CERTIFICATE OF CORRECTION

| | | |
|---|---|---|
| PATENT NO. | : 7,450,566 B2 | Page 1 of 1 |
| APPLICATION NO. | : 10/642251 | |
| DATED | : November 11, 2008 | |
| INVENTOR(S) | : Wong | |

It is certified that error appears in the above-identified patent and that said Letters Patent is hereby corrected as shown below:

In the Drawings
On sheet 7 of 7, in Figure 7, below Ref. numeral 708, line 2, after "NUMBER" insert -- ) --.

Signed and Sealed this

Twentieth Day of April, 2010

David J. Kappos
*Director of the United States Patent and Trademark Office*